(12) United States Patent
Li

(10) Patent No.: US 6,175,311 B1
(45) Date of Patent: Jan. 16, 2001

(54) ON-LINE UPS CONTROLLABLE FROM FAR END

(75) Inventor: Yung-Feng Li, Shijr (TW)

(73) Assignee: Digipower Manufacturing Inc., Shijr City (TW)

( * ) Notice: Under 35 U.S.C. 154(b), the term of this patent shall be extended for 0 days.

(21) Appl. No.: 09/505,850

(22) Filed: Feb. 17, 2000

(51) Int. Cl.[7] .................................................. G08B 21/00
(52) U.S. Cl. ........................ 340/657; 340/660; 363/41; 363/26; 363/34; 307/64; 307/67
(58) Field of Search ..................... 340/657, 660, 340/664, 636, 644, 645, 693.1–693.4; 363/41, 13, 15, 26, 34, 35, 39; 307/67, 68, 150, 151, 64, 43, 44, 65

(56) References Cited

U.S. PATENT DOCUMENTS

| | | | |
|---|---|---|---|
| 4,860,185 | * 8/1989 | Brewer et al. | 363/41 |
| 4,876,460 | * 10/1989 | Johnson | 307/64 |
| 5,465,011 | * 11/1995 | Miller et al. | 307/64 |
| 5,612,581 | * 3/1997 | Kageyama | 307/64 |
| 5,619,077 | * 4/1997 | Green et al. | 307/64 |
| 5,896,282 | * 4/1999 | Wu | 363/96 |

\* cited by examiner

*Primary Examiner*—Daniel J. Wu
*Assistant Examiner*—Daniel Previl
(74) *Attorney, Agent, or Firm*—Bacon & Thomas, PLLC

(57) ABSTRACT

An ON-LINE uninterrupted power supply (UPS) of this invention serving as a long term high quality power supply for web, telecommunication, security system, etc is characterized in detecting a ring signal from far end for ON/OFF control of an output power and in permitting omni-range input civil power to avoid any unstable output power.

2 Claims, 2 Drawing Sheets

ON-LINE UPS CONTROLLABLE FROM FAR END

BACKGROUND OF THE INVENTION

1. Field of the Invention

This invention relates generally to an uninterrupted power supply (UPS), more particularly, to an improved ON-LINE UPS, which is capable of avoiding electrical shock in replacement of battery when the civil power is under supply and regulating output voltage in spite of changes in input voltage, combined with an appending function of controlling switches from far end by means of detecting ring signal.

2. Description of the Prior Art

An average OFF-LINE UPS is characterized that when the civil power is supplied normally, the output voltage will change subject to change of the input voltage through a relay to probably mangle components in the following stages.

A conventional ON-LINE UPS is to charge a battery through a transformer and a rectifying/charging device or a single rectifying/charging device when the civil power is applied so that the charging voltage of the battery will be varied according to the input rectified voltage to probably mangle the battery and shorten lifetime thereof; and, because the charging circuit is coupled directly with the civil AC power, a user may be electrically shocked when replacing the battery.

Nevertheless, so far, not yet an OFF-LINE or an ON-LINE UPS has been applied in an unmanned relay station for electric power management controllable from far end by availing itself of an existing telecommunication device from which the concept of this invention stems. In view of the demand and after years of constant effort in research, the inventor of this invention has consequently developed and proposed this improved mechanism pertaining to the subject matter.

SUMMARY OF THE INVENTION

The primary object of this invention is to improve the existing UPS for solving the problem of an unmanned relay station for electric power management controllable from far end effectively by a simple way.

Another object of this invention is to improve the existing OFF-LINE UPS to avoid any bad affect on its output power caused by change of its input power.

Yet another object of this invention is to enhance isolation between the AC input power and the battery of the existing ON-LINE UPS.

In order to realize the abovesaid objects, this invention comprises an AC/DC converter, a charger, a battery detector, a DC/DC booster, a DC/AC inverter, a ring detector, and a controller.

The AC/DC converter is used to convert the AC input power into a high-voltage DC power for the DC/AC inverter, wherein a high efficiency PWM is adopted to permit omni-range input power for conversion into a stable output power and isolate the primary AC input power from the battery to avoid electric shock when replacing the battery. The concise circuit of the AC/DC converter is composed of components including U1, U2, Q1, T1, D1, BD2, ZD1, ZD2, C2, C3, C4, and R3.

The charger is a charging circuit used to charge the battery with limited voltage and current without exceeding rated values when the civil power is available. The main components of the charging circuit include ZD3, Q2, R4, and R5.

The battery detector is used to detect the battery voltage and transmit the measured data to the controller for shutting down the battery's power in order not to over-discharge. The main components of the voltage detector include R8, R9, and U6.

The DC/DC booster is supposed to boost the battery voltage in case of civil power failure, and the components included are U2, Q3, T2, D2, C5, R6, and R7.

The DC/AC inverter is used to change the DC voltage output of the AC/DC converter or the high-voltage output of the DC/DC booster into a sine-wave voltage output, and the components included are U4, US, Q4, Q5, Q6, Q7, L1, and C6.

The ring detector is used to fetch an alternating ring signal from a capacitor. The ring signal then undergoes a bridge rectifier to produce a DC voltage that is applied to an LED of a photocoupler in forward direction with a resister combined in series for current limitation of the LED. When the LED is lightened, a transistor in an opposite position inside the photocoupler is conducted and the voltage of the output ring signal would approach zero, and on the contrary, when the transistor is open, the voltage of the output ring signal is equal to +Vcc. When ringing, as the DC voltage difference between the phone lines is hindered by an interpolated capacitor, the ring detector containing CN1, BD1, U3, C1, R1, and R2 will not be intervened by any other alternating signal.

The controller is composed of some electronic elements or a microcontroller plus a control program to thereby control the DC/DC booster and the DC/AC inverter for output of an AC power depending on conditions of the power switch, charge quantity of the battery, ring signal, and status of the output power.

The abovesaid well isolated ON-LINE UPS controllable from far end can ensure safety in replacing the battery and in omni-range AC power input.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
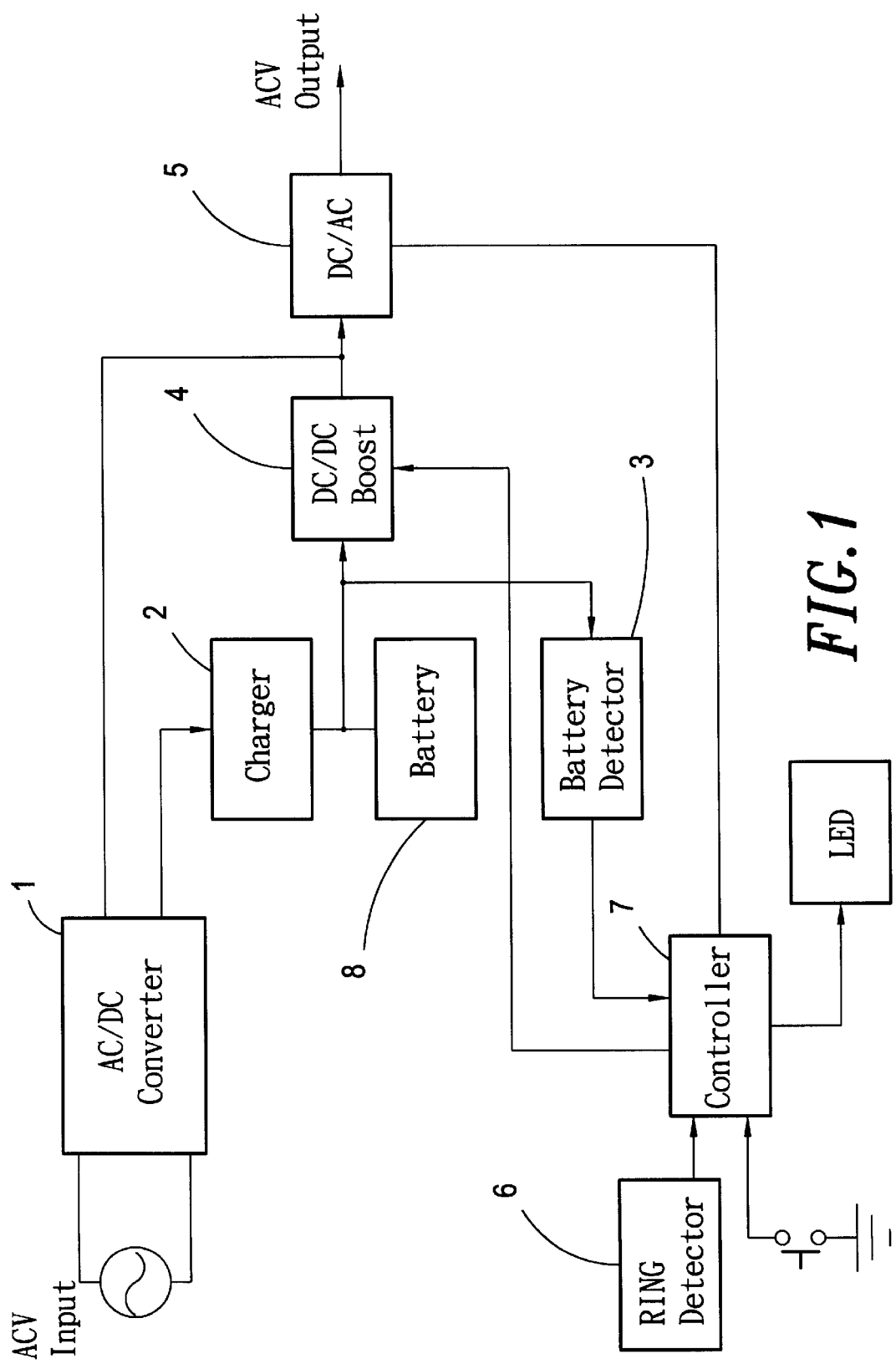
FIG. 1 is a schematic block diagram of an ON-LINE UPS controllable from far distance by detecting phone rings of this invention.
Figure 2:
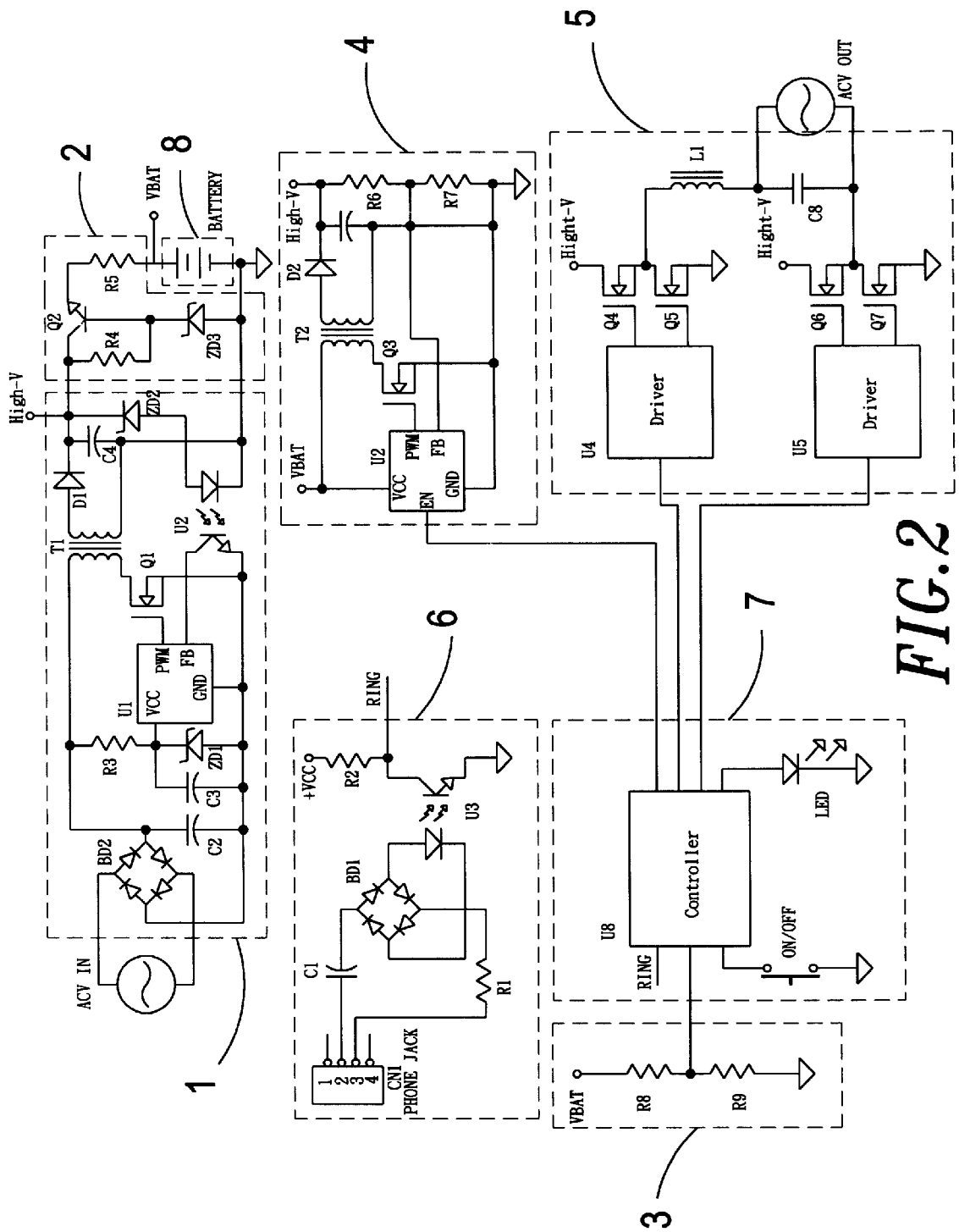
FIG. 2 is a circuitry schematic view of the ON-LINE UPS controllable from far distance by detecting phone rings of this invention.

As shown in FIG. 1, 2, the civil AC power undergoes an AC/DC converter 1, including a bridge rectifier (BD2, C2), a Zener voltage regulator (ZD1,R3, C3), and a pulse width modulator (PWM=U1, Q1, T1, U2, ZD2) to create an AC power source, which is stabilized by changing pulse width subject to change of DC voltage provided by a feedback circuit (U2, ZD2) and is rectified by a half-wave rectifier (D1, C4) to produce a high-voltage DC power.

The high-voltage DC power is used to charge a battery 8 via a charger 2 (Q2, ZD3, R4, R5), wherein the charging voltage and current are controlled under rated values by the Zener diode ZD3 and the resistance R5 respectively for protecting the battery 8. A DC/AC inverter 5 is arranged for changing a DC power obtained from the AC/DC converter 1 or a high-voltage DC power from a DC/DC booster 4(U2, Q3, T2, D2, C5, R6, R7) by push-pull power transistors Q4, Q5, Q6, Q7 and damping impedance of L1, C6 into a sine-wave AC power.

The DC/DC booster 4 depends on a PWM (U2, Q3, T2) to oscillate and create an AC power in the case of power failure of the civil AC power, wherein the created AC power will be changed in pulse width according to DC voltage variation of a feedback circuit (R6, R7) for stabilizing its voltage and current. The AC power is then rectified by a half-wave rectifier (D2, C5) to produce a highvoltage DC power coupling in parallel with another high-voltage DC power at the input terminal of the DC/AC inverter 5.

Moreover, a ring detector 6 (BD1, U3, C1, R1, R2, CN1) is used to fetch ring signal from a capacitor C1, which then undergoes a bridge rectifier BD1 to obtain a DC voltage that lightens a light-emitting diode (LED) U3 of a photocoupler and forwards an acceptable ring signal RING to a controller 7 for reading.

The controller 7 is usually composed of several electronic components or a microcontroller plus application programs for controlling action of the PWM U2 of the DC/DC booster 4 and the DC/AC inverter 5 according information of the power switch, the battery detector 3, the ring signal RING, and the status of the output power.

The merits of this invention may be summarized below when compared with a conventional:

1. This invention is applicable to control an unmanned relay station for electric power management via telephone lines without limitation of space, time, or distance.

2. By taking advantage of the PWMs, a better severance is provided to protect a user against electric shock when replacing the battery, and meanwhile, a more stable charging voltage is made possible to avoid marring the battery to prolong lifetime thereof.

3. The additional PWM in the DC/AC inverter permits omni-range of AC power at the input terminal without affecting the output voltage at the output terminal to thus maintain a stable output AC voltage.

In the above described, at least one preferred embodiment has been elucidated with reference to drawings annexed, it is apparent that numerous variations or modifications may be made without departing from the true spirit and scope thereof, as set forth in the following claims.

What is claimed is:

1. An ON-LINE uninterrupted power supply (UPS) controllable from far end, comprising:

an AC/DC converter utilized to convert an AC input power into a DC power by a bridge rectifier for supplying power to a transformer, a transistor, and a pulse width modulator (PWM) to oscillate and create a higher voltage signal which is then rectified by a diode to in turn supply a stable high voltage DC power for a DC/AC inverter and a battery in virtue of a cooperative feedback circuit including a Zener diode and a photocoupler, wherein said PWM at high efficiency is capable of permitting omni-range AC input power and isolating the primary AC input power from said battery to avoid electric shock when replacing the latter;

a charger using the high voltage DC power to charge said battery in a manner of limited voltage and current under rated values via a transistor switching circuit and a Zener voltage regulating diode when the civil power is available to ensure a safe and best charge process;

a battery detector being provided with a component voltage rendered by a resistive voltage divider to notify a controller to shut down said battery in time for prolonging lifetime of the latter;

a DC/DC booster utilized to boost the battery voltage in case of civil power failure to supply a high voltage power to a DC/DC inverter via a PWM, a transistor, a transformer, and a rectifying diode;

said DC/AC inverter used to change the DC voltage output of said AC/DC converter or the high-voltage output of said DC/DC booster into a sinewave voltage output via a driver, a power transistor, and an electric inductor;

a ring detector further comprising a capacitor, a bridge rectifier, and a photocoupler used to fetch a ring signal and notify said controller to enable or disable power output; and said controller composed of some electronic elements or a microcontroller plus a control program to thereby control said DC/DC booster, a power indicating light, and said DC/AC inverter for output of an AC power according to conditions of the power switch, charge quantity of the battery, ring signal, and status of the output power;

wherein said ring detector is ready to detect a ring signal for ON/OFF the output power for power management; and said AC/DC converter adopts said PWM to effectively isolate the primary AC power from said battery for safe replacement of the latter and permit omni-range AC input power to ensure safe operation.

2. The ON-LINE UPS controllable from far end of claim 1, wherein the AC input power applied to said AC/DC converter is 80V AC~240V AC at least or up.

* * * * *